United States Patent Office 2,995,536
Patented Aug. 8, 1961

2,995,536
PERMANENT FLAME RETARDANT ELECTRICAL LAMINATING VARNISH
Joseph A. Ruffing, Glen Rock, N.J., assignor to Allied Chemical Corporation, New York, N.Y., a corporation of New York
No Drawing. Filed July 22, 1959, Ser. No. 828,695
6 Claims. (Cl. 260—25)

This invention relates to impregnating resinous varnish compositions and more particularly refers to flame retardant laminating varnishes which will produce laminates having good electrical properties and permanent flame resistance.

The electrical industry requires and employs resinous laminates produced by impregnating fibrous sheets with a varnish and laminating the impregnated fibrous sheets under heat and pressure. Alternatively, the impregnated fibrous sheet can be rolled into tubes, non-circular shapes or rods by winding it tightly on a heated mandrel followed by oven curing. The basic shapes are then fabricated into various insulating switch gear parts, such as bushings, operating rods, bus bars, etc.

The National Electrical Manufacturers Association termed for short in the industry "NEMA" has set rigid specifications for the electrical and physical properties of such laminates and these specifications are titled "NEMA XX." In addition to having good electrical properties, the industry has sought to produce laminates which also have permanent flame resistant properties. Now this does not mean that insulating material has not been made which does not have fire resistant properties as well as good electrical properties, as for example porcelain and polyester-glass, but such other materials have been deficient in some of their other properties, e.g. porcelain is inferior with respect to impact strength and formability, and polyester-glass is inherently more expensive. The National Electrical Manufacturers Association recognized the advantage of phenolic resins in the production of laminates both from its low cost and superior electrical properties and is developing specifications for properties of flame retardant phenolic paper laminates.

An object of the present invention is to provide a laminating varnish having characteristics which will produce a laminate (or tube) having the combination of permanent flame resistant properties and good electrical properties. Another object of the present invention is to provide a laminate composed of a plurality of fibrous sheets impregnated with a phenol-formaldehyde laminating varnish bonded together and having the combination of permanent flame resistant properties and good electrical properties. Other objects and advantages will be apparent from the following description.

The use of chlorinated additives to phenol-formaldehyde resins to impart flame retardant properties has been suggested. Unfortunately, these additives tend to depreciate the electrical as well as other properties of the phenol-formaldehyde resin, and more important, these additives are "fugitive," i.e. are transient and do not impart permanent flame resistant properties to the laminate. The importance of having a laminate with permanent flame resistant properties is obvious.

In accordance with the present invention permanent flame retardant laminating varnishes having good electrical properties have been produced by combining a non-curing varnish comprising in solution a fusible reaction product of para-chlorophenol with formaldehyde in the molar ratio of about 1:1.4, preferably about 1:1, in the presence of a catalyst having the formula:

wherein R, $R_1$ and $R_2$ may be hydrogen, alkyl, aryl, arylalkyl and alkaryl groups, preferably ammonia, and a potentially reactive, phenol-formaldehyde varnish comprising in solution a reaction product of formaldehyde and a phenol selected from the group consisting of phenol, cresols, xylenols, and mixtures thereof in the molar proportion of about 1:0.9 to 1:1.4, preferably about 1:1, in the presence of a catalyst having the formula:

wherein R, $R_1$ and $R_2$ may be hydrogen, alkyl, aryl, arylalkyl and alkaryl groups, preferably ammonia, said non-curing varnish and said potentially reactive varnish being combined in the proportion of 20–60 parts by weight non-curing reaction product to 80–40 parts by weight potentially reactive reaction product, preferably about 1 part by weight non-curing reaction product to about 1 part by weight potentially reactive reaction product.

The non-curing, fusible varnish is made by heating a mixture of para-chlorophenol with a small molar excess of formaldehyde in the presence of ammonia under reflux and continuing heating under vacuum at a temperature up to about 95° C. until the free formaldehyde concentration drops to within the range of about 2.0–2½%. Heating is continued under vacuum at a temperature in the range of 50° C. to 150° C. and until substantially all the water is removed. The para-chlorophenol-formaldehyde condensation product is cooled to a temperature of about 60–80° C. and then dissolved in an inert organic solvent such as methanol, ethanol or isopropanol to produce a varnish having a solids content of about 65–75%. This varnish has the following properties:

ASTM solids, percent_____ 65–75
Viscosity at 25 cp_____ 800–2500
Free formaldehyde, percent_____ 2.0 max.
Cure time at 150° C. sec_____ Non-curing The catalyst for effecting the condensation between para-chlorophenol and formaldehyde is preferably ammonia, but may be an ammonia substituted compound in which one or more hydrogens of ammonia are substituted by an alkyl or aryl group, as for example methylamine, dimethylamine, trimethylamine, monoethylamine, diethylamine, triethylamine, hexamethylene tetramine, benzylamine and methylbenzylamine. The amount of catalyst employed is of the order of several percent, from about 2–10%, preferably about 2.5–3.5%, based on the weight of para-chlorophenol. For convenience, the catalyst may be added in the form of an ammonium hydroxide solution.

Although the non-curing varnish per se has built-in potentially adequate fire retardance it is completely unsuitable for production of laminates because of its non-curing nature.

The potentially reactive varnish is produced by heating a mixture of phenol, cresol or xylenol, or preferably a commercial mixture of these constituents known in the industry as "tar acid" or "cresylic acid" with about an equimolar amount of formaldehyde in the presence of ammonia or amine catalyst (the same catalyst as used in producing non-curing varnish) in an amount of about 0.25–5.0%, preferably 0.75–1.25%, by weight of the phenol under reflux to a temperature of about 95° C. until the free formaldehyde content is reduced to about 2.0–3.0% based on the entire reaction mass. The phenol-formaldehyde reaction mass is then dehydrated under vacuum until the desired solids content is reached, about 75–95%, and until the cure time at 150° C. has decreased to 30–150 seconds and the resin is then cooled to a temperature of about 50–80° C., and a solvent such as methanol, ethanol or isopropanol added to the resin to produce a varnish having a solids content of about 55–70%. The potentially reactive varnish has the following typical properties:

| | |
|---|---|
| ASTM solids, percent | 55–70 |
| Viscosity at 25° C., cp | 100–1000 |
| Free formaldehyde, percent | 2.0 |
| Cure time at 150° C. sec | 30–150 |

The non-curing para-chlorophenol-formaldehyde varnish and the potentially reactive phenol-formaldehyde varnish are blended by simply mixing the two components in a large kettle at atmospheric temperature or, if desired, but unnecessary, at slightly elevated temperatures up to 40–50° C. To obtain the benefit of flame retardant properties as well as good electrical properties, the two components should be blended in the proportion of 20–60 parts by weight non-curing reaction product to 80–40 parts by weight potentially reactive reaction product, preferably in approximately equal proportions. The properties of the blend are as follows:

| | |
|---|---|
| ASTM solids, percent | 60–70 |
| Viscosity at 25° C., cp | 300–1000 |
| Free formaldehyde, percent | 2 max. |
| Cure time at 150° C. sec | 100–200 |

The effect of the two resins in the blend is not simply one of addition but co-reactivity is attained under the conditions of forming laminates as is evidenced by the relatively small change in cure time. This is further evidenced by the addition of a non-reactive additive such as "Celluflex CEF" to the potentially reactive resin with a significantly greater change in cure time. The laminates prepared from the varnish of the present invention have the unique property of inherent permanence and flame retardance which will not be lost by volatilization. Laminates containing this resin will burn only during exposure to very high temperatures such as a gas flame or electric arc but will extinguish immediately, or very shortly after the removal of the source of ignition. Superior results were obtained in both the NEMA flammability test and Bunsen burner test in grade XX laminates based on the laminated varnish of the present invention in comparison to other resins containing commercially available, conventional flame retardant additives. As an example, in the NEMA flammability test, laminates prepared in accordance with the present invention exhibit ignition times in excess of 150 seconds and burning times of less than 30 seconds in comparison to ignition times of less than 100 seconds and burning times of more than 50 seconds for laminates containing liquid additives.

In the preparation of grade XX laminates filler stock, 10 mil international alpha cellulose, is impregnated with the laminating varnish of the present invention and subjected to the following treating conditions in accordance with the practice of producing laminates:

| | |
|---|---|
| Oven residence time, min | 10–12 |
| Treating temperature, F.: | |
| Wet zone | 270 |
| Dry zone | 260 |
| Treated stock properties: | |
| Resin content, percent | 51.8 |
| Volatile content (10 min. at 320 F.), percent | 3.1 |
| Flow (4-inch disk, 1000 p.s.i., 10 min. at 300 F.), percent | 0.5–1.0 |
| Pressing conditions: | |
| Pressure, p.s.i. | 1500 |
| Temperature, F. | 310–320 |
| Time (above 300 F.), min | 25 |

LAMINATE PROPERTIES

The electrical and mechanical properties of the laminates produced in accordance with the present invention in the comparison below illustrate their utility for switch gear and similar applications:

| | Specimen Thickness | | NEMA XX Requirements |
|---|---|---|---|
| | 1/4" | 1/2" | |
| Physical Properties: | | | |
| Flexural Strength, p.s.i.— | | | |
| LW | 15,200–22,000 | | 15,000. |
| CW | 14,000–19,800 | | 14,000. |
| Compressive Strength, p.s.i., Flat | | 38,400–40,500 | |
| Izod Impact, ft.-lbs./in. Edgewise— | | | |
| LW | | 0.50 | 0.40. |
| CW | | 0.40 | 0.35. |
| Bonding Strength, lbs. | | 800–1,000 | 800. |
| Specific Gravity | | 1.45 | |
| Water Absorption, Percent, D24/23 | 0.7–1.2 | | 1.30. |
| Electrical Properties: | | | |
| Dielectric Strength, V.P.M., Perpendicular— | | | |
| Short Time | 490–520 | | |
| Step-by-Step | 410–430 | | |
| Dielectric Breakdown, kv., parallel— | | | |
| Cond. A: | | | |
| Short Time | 75–95 | | |
| Step-by-Step | 65–85 | | 40 (min.). |
| D48/50: | | | |
| Short Time | 5.5–6.1 | | |
| Step-by-Step | 5.0–5.6 | | 5.0 (min.). |
| Insulation Resistance, Megohms C96/35/90 (tapered pins) | 150–300 | | |
| Dielectric Constant, 1 mc.: | | | |
| Cond. A | 4.4–4.6 | | 5.50 (max.). |
| D24/23 | 4.7–4.9 | | 6.00 (max.). |
| Dissipation Factor, 1 mc.: | | | |
| Cond. A | 0.036–0.039 | | .045 (max.). |
| D24/23 | 0.040–0.048 | | .050 (max.). |
| Volume Resistivity, Megohm, cm., C96/35/90. | 600,000–900,000 | | |

To increase flexibility of the laminate, an abietic acid compound such as abietic acid and its derivatives which include methyl and ethyl esters of abietic acid may be incorporated in the laminating varnish in an amount of about 1–20%, preferably 5–15% by weight of the varnish.

Tubes can be fabricated from laminates impregnated with the laminating varnish of the present invention by the methods normally used for rolling phenolic tubes, e.g., treated stock is wrapped around a mandrel under heat and pressure of a contact roll. The tube and mandrel is then cured in an oven maintained at 250–325° F. for completion of the cure. Non-circular shapes can also be made with variation of this technique. For optimum moisture resistance high, hard grade resin facer sheets may be employed.

NEMA flammability test

The test now under consideration for adoption as a standard by the National Electrical Manufacturers Association is as follows:

The apparatus consists essentially of an electrical resistance coil one inch in diameter and a spark gap fixed at a point above the top of the coil; these mounted in a vented, controlled draft cabinet. The purpose of the spark is to ignite any inflammable gases given off while the laminate is burning. The 5" x ½" x ½" specimen is clamped at the bottom vertically within the coil so that the electrode spark tips are on two opposite sides of the specimen at the top. The test is started at room temperature. The temperature of the coil is raised at a fixed rate to 860° C. The current is cut off 30 seconds after a flame appears on the sample. The time from the instant the current is turned on until the flame appears is noted as the "ignition time." The "burning time" is the time interval between the instant the current is cut off and the instant the flame is extinguished.

30 second flame test

This method of test was adapted for the purpose of screening laminates in the laboratory not equipped with expensive test equipment and is given in the Underwriters' flame test on sheet insulating material.

The apparatus required consists of a standard ½-inch Tirrell burner, a timing mechanism showing time in seconds, a suitable supported clamp to hold the specimen in position in the flame, and a means of maintaining the test area draft free. The specimen size is 8 to 12 inches long, ½ inch wide and ⅛ inch thick. The sample is clamped at one end in a horizontal position with the plane of the sheet perpendicular to the bench top. The burner is adjusted to burn with a 1½-inch blue cone and a 5-inch overall flame. The height of the clamped sample is adjusted so that the top of the blue cone is at the level of the bottom edge of the sample. The flame is applied for 30 seconds and then removed. The time interval, in seconds, from the removal of the flame to the disappearance of the flame on the specimen is the test value.

The Underwriters' flame test requires the same apparatus and procedure with the exception that the exposure time is 10 seconds. It was found that this gave differences among laminate types in extinguishing times so small that valid conclusions on the relative merit of a particular flame retardant agent or system could not be drawn. The 30-second exposure time gave significant differences and appeared to correlate generally well with the NEMA flammability test.

The term "non-curing fusible reaction product" as commonly employed in the art signifies a resin which upon the application of heat will not become converted to the infusible, insoluble and thermo-rigid state. A potentially reactive resin as commonly used in the art is a resin which upon the application of heat has converted to a non-fusible, insoluble and thermo-rigid state.

The following example illustrates the present invention.

The non-curing varnish component was prepared as follows: A kettle was charged with 18,300 parts para-chlorophenol, 9,408 parts formaldehyde, 50% solution (1.0 mol para-chlorophenol to 1.1 mol formaldehyde) and 2,000 parts of a 28% solution of ammonium hydroxide (3.05% dry basis by weight of para-chlorophenol) and heated under 25 in. Hg vacuum to a temperature of 57–59° C. to allow the charge to come to reflux. Heating was continued to a temperature of 93–95° C. and heating continued at 95° C. until the free formaldehyde content was reduced to 2.0–2.5% as determined by samples withdrawn from the reaction mixture periodically over 20–30 minutes. Vacuum was reduced gradually during the heat-up period so as to allow the mixture to reflux at all times and thus be under constant vacuum control. After reaching the desired free formaldehyde content the vacuum on the kettle was increased to 15–20 inches and dehydration under vacuum continued until the temperature reached about 100° C. Thereafter the resin was cooled to 80° C. under vacuum and ethanol in an amount of 5,300 parts was introduced into the kettle, and the mixture agitated until the resin is dissolved in the ethanol. The resultant varnish was non-curing, had an ASTM solids content of 70%, a viscosity at 25° C. cp. of 1840, and a free formaldehyde content of less than 2.0%.

The potentially reactive phenol-formaldehyde varnish was produced by charging 18,000 parts of tar acid, a commercial mixture of 14–16.5% phenol, 10–14% ortho cresol, 51–56% meta- and para-cresol, and 18–20% xylenol—average molecular weight 108.7, 13,400 parts of 37% formaldehyde, and 540 parts of a 25% ammonium hydroxide solution into a kettle at a vacuum of 7 inches (pressure about 550 mm.) and the mixture heated to reflux temperature of 93° C. and held at 93±2° C. until the free formaldehyde content is 1.0–2.0. Dehydration is started by increasing the vacuum and dehydration continued at a vacuum of about 28 inches or 25–50 mm. pressure. Vacuum is broken when the required amount of water has been removed, a solids content of 85–90%, and heating is continued for several hours at 70–95° C., if desired in the presence of ethanol to the extent of 0–40% of the charge, until the cure time of the varnish is in the range of 40–120 seconds. Ethanol is added to bring the solid content of the mixture to about 59–60%. The resultant varnish was potentially reactive and had a cure time of 81 seconds at 150° C.

The two varnishes produced as above were blended in the proportion of equal amounts of solids content and produced a laminating varnish having a cure time of 129 seconds at 150° C. Laminates were produced by conventional processing in which several sheets of filler stock of 10 mil international cellulose were impregnated with the blended varnish, treated in an oven for 10–12 minutes at a temperature of 260–270° C. and subjected to pressing conditions of 1500 p.s.i. at a temperature of 310° F. for 30 minutes. Specimens were prepared ⅛ inch in thickness, ½ inch in thickness and 1⅛ inch in thickness.

In Table I below the physical and electrical properties are tabulated as well as a comparison with NEMA XX requirements:

TABLE I.—TYPICAL PROPERTIES V-236 XX SHEETS

[Standard A.S.T.M. methods unless otherwise noted]

|  | Specimen Thickness | | | NEMA XX Requirements |
|---|---|---|---|---|
|  | ⅛" | ½" | 1⅛" |  |
| Flexural Strength, p.s.i., LW | 17,500 | | | 15,000 Min. |
| Flexural Strength, p.s.i., CW | 15,500 | | | 14,000 Min. |
| Compressive Strength, p.s.i., Flat | | 40,500 | | |
| Izod Impact, Ft. lbs./inch Edgewise: | | | | |
| LW | | 0.50 | | 0.40 Min. |
| CW | | 0.40 | | 0.35 Min. |
| Bonding Strength, Lbs: | | | | |
| Condition A | | 800 | | 800 Min. |
| Condition D 48/50 | | 500 | | 600 Min. |
| Specific Gravity | | 1.45 | | |
| Water Absorption, Percent D 24/23 | | 0.9 | | 1.30 Max. |

TABLE I.—TYPICAL PROPERTIES V-236 XX SHEETS—Continued

| | Specimen Thickness | | | NEMA XX Requirements |
|---|---|---|---|---|
| | ⅛" | ½" | 1½" | |
| Dielectric Strength, V.P.M., Perpendicular: | | | | |
| Short Time | 490 | | | |
| Step-by-Step | 410 | | | |
| Dielectric Breakdown, kv., Parallel: | | | | |
| Condition A— | | | | |
| Short Time | 75 | | | 40 Min. |
| Step-by-Step | 65 | | | |
| D 48/50— | | | | |
| Short Time | 5.5 | | | 5.0 Min. |
| Step-by-Step | 5.0 | | | |
| Dielectric Constant: | | | | |
| 60 Cycles, Cond. A | | | 5.7 | 5.5 Max. |
| 1 mc., Condition A | 4.6 | | 4.6 | 6.0 Max. |
| 1 mc., D 24/23 | 4.8 | | | |
| Dissipation Factor: | | | | |
| 60 Cycles, Cond. A | | | 0.059 | 0.045 Max. |
| 1 mc., Condition A | 0.036 | | 0.030 | 0.050 Max. |
| 1 mc., D 24/23 | 0.045 | | | |
| Volume Resistivity, megohm-cm., C 96/35/90 | 800,000 | | | |
| NEMA Tentative: | | | | |
| Flammability Test— | | | | |
| Ignition Time, Sec | | 153 | | |
| Extinguishing Time, Sec | | 21 | | |
| Index | | 7.6 | | |
| Underwriters' Test, Seconds: | | | | |
| 10 Sec. Application | 0-3 | | | |
| 30 Sec. Application | 6-10 | | | |
| Insulation Resistance, megohms, C 96/35/90 | 150 | | | 60 Typical. |

Although certain preferred embodiments of the invention have been disclosed for purpose of illustration it will be evident that various changes and modifications may be made therein without departing from the scope and spirit of the invention.

I claim:

1. A permanent flame retardant laminating varnish having good electrical properties produced by combining a non-curing varnish comprising in solution a fusible reaction product of para-chlorophenol with formaldehyde in the molar ratio of about 1:1 to 1:1.4, in the presence of a catalyst having the formula:

wherein R, $R_1$ and $R_2$ may be hydrogen, alkyl, aryl, arylalkyl and alkaryl groups, and a potentially reactive, phenol-formaldehyde varnish comprising in solution a reaction product of formaldehyde and a phenol selected from the group consisting of phenol, cresols, xylenols, and mixtures thereof in the molar proportion of about 1:0.9 to 1:1.4, in the presence of a catalyst having the formula:

wherein R, $R_1$ and $R_2$ may be hydrogen, alkyl, aryl, arylalkyl and alkaryl groups, said non-curing varnish and said potentially reactive varnish being combined in the proportion of 20-60 parts by weight non-curing reaction product to 80-40 parts by weight potentially reactive reaction product.

2. A permanent flame retardant laminating varnish having good electrical properties produced by combining a non-curing varnish comprising in solution a fusible reaction product of para-chlorophenol with formaldehyde in the molar ratio of about 1:1, in the presence of an ammonia catalyst and a potentially reactive, phenol-formaldehyde varnish comprising in solution a reaction product of formaldehyde and a phenol selected from the group consisting of phenol, cresols, xylenols, and mixtures thereof in the molar proportion of about 1:1, in the presence of an ammonia catalyst, said non-curing varnish and said potentially reactive varnish being combined in the proportion of about 1 part by weight non-curing reaction product to about 1 part by weight potentially reactive reaction product.

3. A permanent flame retardant laminating varnish having good electrical properties produced by combining a non-curing varnish comprising in solution a fusible reaction product of para-chlorophenol with formaldehyde in the molar ratio of about 1:1 to 1:1.4, in the presence of an ammonia catalyst, and a potentially reactive, phenol-formaldehyde varnish comprising in solution a reaction product of formaldehyde and a phenol selected from the group consisting of phenol, cresols, xylenols, and mixtures thereof in the molar proportion of about 1:0.9 to 1:1.4, in the presence of an ammonia catalyst, said non-curing varnish and said potentially reactive varnish being combined in the proportion of 20-60 parts by weight non-curing reaction product to 80-40 parts by weight potentially reactive reaction product and 5-15% of an abietic acid compound based on the weight of the laminating varnish.

4. A laminate composed of a plurality of fibrous sheets impregnated with the varnish as claimed in claim 1 bonded together and having permanent flame resistant and good electrical properties.

5. A laminate composed of a plurality of fibrous sheets impregnated with the varnish as claimed in claim 2 bonded together and having permanent flame resistant and good electrical properties.

6. A laminate composed of a plurality of fibrous sheets impregnated with the varnish as claimed in claim 3 bonded together and having permanent flame resistant and good electrical properties.

References Cited in the file of this patent

UNITED STATES PATENTS

| 2,801,198 | Morris et al. | July 30, 1957 |
| 2,816,090 | Wagner | Dec. 10, 1957 |
| 2,827,946 | Christenson et al. | Mar. 25, 1958 |
| 2,879,827 | Bowditch | Mar. 31, 1959 |